United States Patent
Habets

(10) Patent No.: US 7,946,157 B2
(45) Date of Patent: May 24, 2011

(54) METHOD AND DEVICE TO MEASURE, TEST AND/OR MONITOR TURBINE PERFORMANCE

(75) Inventor: Gilbert Lucien Gertrud Marie Habets, Reading (GB)

(73) Assignee: Shell Oil Company, Houston, TX (US)

(*) Notice: Subject to any disclaimer, the term of this patent is extended or adjusted under 35 U.S.C. 154(b) by 139 days.

(21) Appl. No.: 12/522,481

(22) PCT Filed: Jan. 9, 2008

(86) PCT No.: PCT/EP2008/050186
§ 371 (c)(1),
(2), (4) Date: Jul. 8, 2009

(87) PCT Pub. No.: WO2008/046931
PCT Pub. Date: Apr. 24, 2008

(65) Prior Publication Data
US 2010/0050752 A1  Mar. 4, 2010

(30) Foreign Application Priority Data

Jan. 10, 2007 (EP) .................................. 07075020
Jun. 15, 2007 (EP) ................. PCT/EP2007/055945

(51) Int. Cl.
*G01M 15/14* (2006.01)
(52) U.S. Cl. .................................................. 73/112.01
(58) Field of Classification Search ... 73/112.01–112.06
See application file for complete search history.

(56) References Cited

U.S. PATENT DOCUMENTS

| | | | | |
|---|---|---|---|---|
| 5,402,332 A | * | 3/1995 | Kopf | 700/29 |
| 5,913,184 A | | 6/1999 | Girbig | 702/182 |
| 6,909,198 B2 | | 6/2005 | Ragwitz et al. | 290/44 |
| 7,400,050 B2 | | 7/2008 | Jovanovic et al. | 290/1 R |
| 7,523,651 B2 | * | 4/2009 | Bode | 73/112.01 |
| 7,571,057 B2 | * | 8/2009 | D'Amato et al. | 702/33 |
| 7,857,586 B2 | * | 12/2010 | Wobben | 416/1 |
| 2006/0113801 A1 | * | 6/2006 | Schubert et al. | 290/44 |
| 2007/0067114 A1 | | 3/2007 | D'Amato et al. | 702/34 |
| 2008/0049887 A1 | * | 2/2008 | Bode | 377/16 |
| 2008/0164698 A1 | | 7/2008 | Habets | 290/44 |

FOREIGN PATENT DOCUMENTS

| | | |
|---|---|---|
| DE | 422055 | 11/1925 |
| EP | 1659287 | 5/2006 |
| EP | 1669549 | 6/2006 |
| JP | 2003328919 | 11/2003 |
| RO | 0114181 | 1/1999 |

OTHER PUBLICATIONS

International Search Report dated Jun. 2, 2008 International Application No. PCT/EP2008/050186.

* cited by examiner

*Primary Examiner* — Freddie Kirkland, III

(57) ABSTRACT

A set of data is measured reliably and accurately to test, operate and/or monitor the performance of turbines. It is proposed to determine the performance parameters of a turbine applicable to its entire operating envelope and for a condition when it is producing net output power, by measuring its characteristic performance parameters in the mode of no net output-power production.

20 Claims, 8 Drawing Sheets

METHOD AND DEVICE TO MEASURE, TEST AND/OR MONITOR TURBINE PERFORMANCE

The present application claims priority from European Patent Application 07075020.3 filed 10 Jan. 2007, International Patent Application PCT/EP2007/055945 filed 15 Jun. 2007, and U.S. patent application Ser. No. 11/727,304 filed 26 Mar. 2007.

FIELD OF THE INVENTION

The present invention relates to a method of monitoring the condition (performance) of a turbine, such as a fluid-driven turbine, for example a wind- or liquid-driven turbine. In another aspect the invention relates to a turbine system.

BACKGROUND OF THE INVENTION

Regularly inspecting a turbine is necessary to reduce the chance of experiencing an unexpected failure. The frequency of turbine inspection is generally determined by the requirement that it should be such as required to maintain the equipment and to ensure its operating function. Normally a frequency of once per year is recommended.

Hydraulic turbines may be used to expand liquefied natural gas from a high pressure (typically between 40 bar and 150 bar) to about atmospheric pressure. Since the volumetric flow rates of the liquefied natural gas flowing through the turbines is of the order of 500 m$^3$/hour, the size of such turbines is great.

Inspecting such a large turbine is very laborious, and associated with such an inspection is a loss of production of liquefied natural gas. On the other hand, there are huge consequences associated with a failure of a component of such a turbine.

Therefore there is a need for a simple method of monitoring the condition of a turbine, which results in a qualitative assessment of the condition. Based on this assessment it can be assessed whether inspection is warranted.

SUMMARY OF THE INVENTION

In one aspect, the invention provides a method of monitoring the condition of a turbine, comprising the steps of:
  determining an initial no net output power characteristic for the turbine;
  allowing the turbine to run for an amount of time;
  determining a new no net output power characteristic for the turbine; and
  comparing the new no net output power characteristic with the initial no net output power characteristic, wherein differences in the no net output power characteristics give indications about the condition of the turbine.

In yet another aspect of the invention provides a turbine system comprising:
  a turbine drivable by a fluid flow, which turbine has an output shaft to which it delivers an output power during operation;
  measuring means arranged at the turbine for measuring operational parameters of the turbine;
  a monitoring unit for monitoring the condition of the turbine train, which monitoring unit is connected to the measuring means, which monitoring unit comprises a memory in which an initial no net output power characteristic for the turbine is stored, as well as computing means to calculate a new no net output power characteristic of the turbine-generator train based on the measured operational parameters, and a comparer to compare the new no net output power characteristic with the initial no net output power characteristic.

BRIEF DESCRIPTION OF THE DRAWINGS

The invention will now be illustrated in more detail and by way of example and with reference to embodiments and the drawings, in which.

DETAILED DESCRIPTION OF THE INVENTION

Described herein are methods and devices to measure (reliably and accurately) a set of data that may be used to test, operate and monitor the performance of turbines. Both terms "performance" and "condition" of a turbine are interchangeably used in the specification and claims.

The described methods and devices are applicable to all types of turbines that are energised by a fluid flow at the entry and which convert the energy from this entry flow into rotational energy that can be utilised from the shaft, and may be used to determine the performance of the turbine and/or for determining the best efficiency flow for operating the turbine.

In one aspect, a method of monitoring the condition of a turbine is proposed, that comprises the steps of determining an initial no net output power characteristic, allowing the turbine to run for an amount of time, determining a new no net output power characteristic and comparing the new no net output power characteristic with the initial no net output power characteristic, wherein differences in the no net output power characteristics give indications about the condition of the turbine.

Based on said differences, the condition of the turbine may be determined. A qualitative assessment of the condition of the turbine may thus be made, which may be used to assess the need to physically inspect the turbine.

Thus the initial no net output power characteristic is used as a reference characteristic, or verification characteristic, of the turbine in question. An advantage of this method is that any new no net output power characteristic (may hereinafter also be referred to as "no net output power curve" of the turbine) is thus compared to a fixed reference characteristic or verification characteristic in the form of the initial no net output power (e.g. no-load) characteristic.

The no net output power characteristics may be obtained in the form of a no-load characteristic or a no-speed characteristic. A no-load characteristic ideally refers to a condition wherein the turbine is operated at a zero torque. For instance, the initial no net power characteristic, which may be an initial no-load characteristic, may be the no net power characteristic (such as the no-load characteristic) as determined in the factory after having completed the turbine, or determined immediately after installation of the turbine or after a major overhaul of the turbine.

The characteristics of a turbine are in principle determined by three parameters, head, flow rate, and turbine speed, and they may be plotted in the form of a curve in a graph that plots any parameterisation function of these three parameters against any other parameterisation function of these three parameters. Common examples are curves plotted as head against flow rate, turbine speed against flow rate, and turbine speed against head. However, other derived parameterisation functions may be used.

Figure 1:
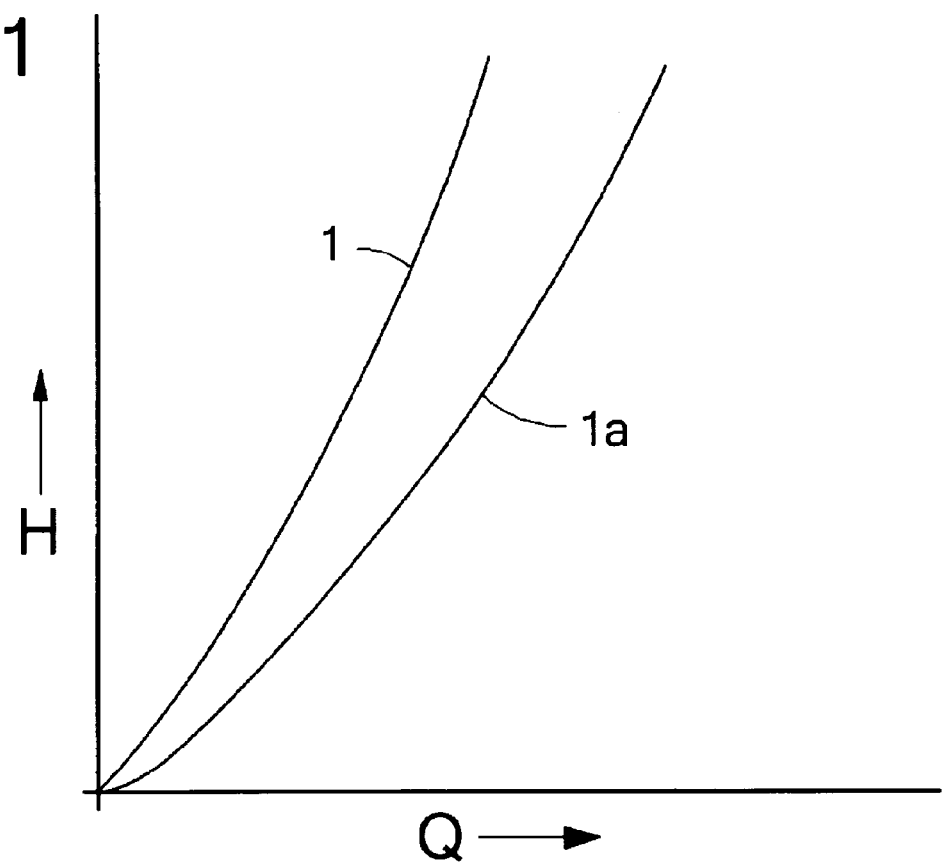
FIG. 1 schematically shows no-load curves in a head-flow rate diagram of a turbine.

FIG. 1 shows the performance characteristic of a typical hydraulic turbine operating at variable speed. The performance map consists of various performance curves depicting the relationship between head H, flow Q and rotational speed N of the turbine.

The head H is plotted along the vertical axis (y-axis) and the flow rate Q is plotted against the horizontal axis (x-axis).

Head is generally understood to be the difference between the specific enthalpies of the fluid at the turbine inlet and outlet, respectively, and the flow rate is generally understood to represent the flow rate of the fluid at the discharge end of the turbine.

In case of incompressible liquids, Q is the symbol for the volumetric flow rate, e.g. expressed in cubic-meters per hours, and H is the symbol for the differential head, e.g. expressed in meters.

In case of compressible fluids, particularly liquid-vapour mixtures, Q is the symbol for the mass flow rate, e.g. in kilogram per second, and H is the pressure difference, e.g. in Megapascal, between the turbine inlet and outlet.

The curve referred to with reference numeral 1 is the initial no-load characteristic of the turbine, which in the present example is the head H as a function of the flow rate Q. The curve referred to with reference numeral 1a is the new no-load characteristic of the turbine obtained after the turbine has run for a pre-determined amount of time.

When the condition of the turbine has deteriorated, the new no-load 1a characteristic lies to the right side of the initial no-load characteristic 1. The magnitude of this shift will give a qualitative assessment of the condition of the turbine, and thus it can be assessed whether inspection is warranted.

Although a no-load curve can very easily be obtained, in practice the entire new no-load curve does not need to be determined; only a few points of this curve may suffice to give the required information. In theory, only one point of the new no-load curve is required, and as the head H is proportional to the square of the flow rate Q, the new no-load curve can be constructed. However, it is preferred to determine at least two or three points of the new no-load curve.

In case the turbine is connected to an electric generator, the no-load curve may be determined when the electric generator does not deliver any electric power so that the braking torque is virtually zero.

Figure 2:
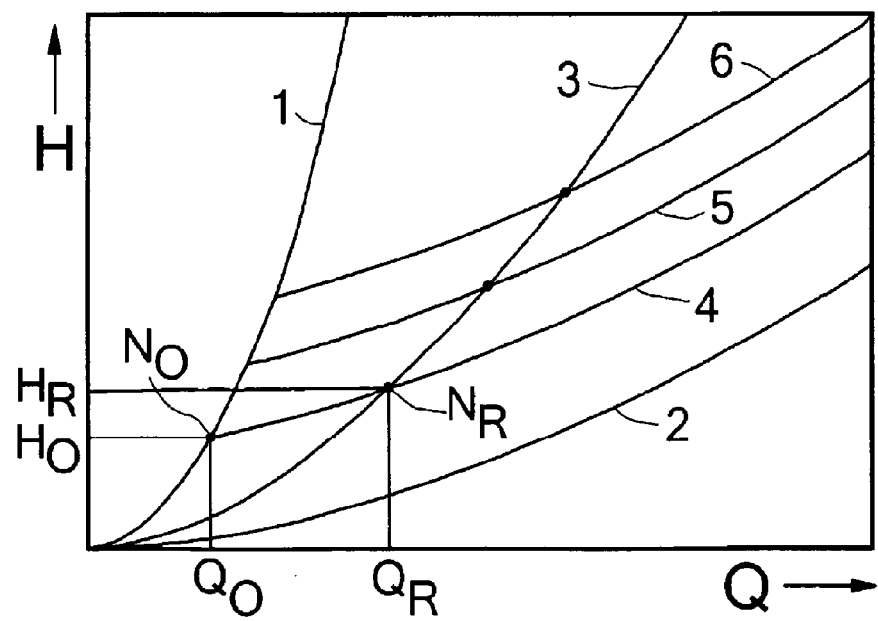
FIG. 2 schematically shows a performance characteristic of a typical hydraulic turbine operating at variable speed.

Referring now to FIG. 2, the no-load characteristic 1 is the boundary line of the turbine performance envelope corresponding with a no-load condition of the turbine in the low flow area. In this condition the turbine produces no net output power and all hydraulic input energy is utilised to spin the turbine at a certain speed with corresponding losses.

The no-speed characteristic 2 is the boundary line of the turbine performance envelope corresponding with a non-rotating condition of the turbine. In this condition the turbine is at standstill and operating like an orifice.

Along the characteristic 1 the turbine is producing no net output torque and therefore no net power. Along the characteristic 2 the turbine produces maximum torque but no net power due to rotational speed equal to zero. The turbine operational field is bounded between 1 and 2, and along the best-efficiency characteristic 3 the maximum efficiency defined as power output over power input is achieved.

The typical performance lines 4, 5, 6 at constant speeds are approximately parallel to each other and to the no-speed characteristic 2. With increasing speed the constant speed curves 4, 5, 6 move to higher head values.

The best efficiency characteristic 3 intersects with each constant speed curve 4, 5, 6 at a corresponding intersection point. This point is the best efficiency point for a certain speed. Each of these points has a certain flow Q, head H and speed N that is called rated flow $Q_R$, rated head HR and rated speed $N_R$, since the rated point is generally also the best efficiency point.

The no-load characteristic 1 intersects with each constant speed curve 4, 5, 6 at another corresponding intersection point. Each of these points has a certain flow Q, head H and speed N, which is called no-load flow $Q_0$, no-load head $H_0$ and no-load speed $N_0$.

It has been contemplated that the performance parameters of a turbine applicable to its entire operating envelope, and for a condition when it is producing net output power, can be determined from only its characteristic performance parameters in the mode of no net output-power production. Thus, merely measuring its characteristic performance parameters in the mode of no net output-power production may suffice. The performance response of a turbine under no-load conditions and/or no-speed conditions may be measured when subject to known values of input for flow, head, hydraulic energy and fluid properties.

The present invention is based on the insight that the mechanical and geometrical design of the turbine and the thermo-physical properties of the fluid determine the shape of the characteristics 1 and 2. Both characteristics 1 and 2 determine the shape of the best-efficiency characteristic 3.

It is important to note that both the no-load characteristic 1 and no-speed characteristic 2 are measured and recorded during the operational mode without any net power production or without energized electric generator. They both determine the best-efficiency characteristic 3 for which the power is produced with best efficiency. Therefore, any change in the shape of 1 or/and 2 has a direct effect on the shape of 3 and on the complete operational performance.

This means that before a turbine is operating in an energised mode, whereby it delivers net power at the shaft, its characteristics can be fully defined. For a turbine that is installed in an industrial or domestic or utility application and which has been subject to a maintenance overhaul, the performance can be verified before it is put back in service again without having to energise it first.

Another preferable option is regular verification of the performance characteristic of turbines or variations thereof, which can be executed at any time interval without having to remove the turbine from its installed position, but by merely operating it in a no-load condition.

In a preferred embodiment it is proposed to measure and to record the no-load characteristic and/or no-speed characteristic of turbines that are operating in the field at certain time intervals and to compare these to one or more previously determined characteristics. Any variation of these characteristics is a direct measure for the internal condition of a hydraulic turbine and will eliminate the need to disassemble a turbine and visually inspect its internals at regular intervals to assess its condition.

The measurement and recordal of the no-load and/or no-speed characteristic of a turbine operating in the field can be performed by a dedicated unit, such as a performance and monitoring unit. This unit may perform data collection, data analysis and calculation. The monitoring unit for monitoring the performance and condition of the turbine is preferably integrated in a turbine control unit.

The methods of the present invention may provide a true and reliable on-line performance and condition assessment of turbines resulting in significant operating and maintenance cost reductions.

Application of the methods and apparatuses and systems described herein includes, but is not limited to, all types of turbines in water and any fluid power turbines, wind power turbines, gas expanders and turbo expanders.

Application of the invention may include, but is not limited to, all types of rotating equipment that are being energised from a fluid flow that results in a torque from its shaft. The characteristics measured are specific signatures and are a measure of its performance.

However, in particular, application of the methods and apparatuses described herein is contemplated for turbines that are used for expanding cryogenic fluids such as liquefied natural gas or refrigerants used to cool and produce liquefied natural gas, and for turbines for services at hydroelectric power plants.

In practice, turbines, e.g. cryogenic turbines, may have the generator integrated with the turbine shaft, i.e. no separate coupling in between. For those units the no load characteristic for the entire turbine/generator shaft train assembly may be measured as if it is one unit, whereby any losses will be a composite of both generator/turbine. For those turbines with separate shaft couplings, the coupling can be disconnected, this will give no-load characteristic of turbine pure. However coupling can remain connected and then the entire train is measured as if one unit.

The no-load characteristic (e.g. line 1 in FIG. 2) of a hydraulic turbine is generally a three-dimensional curve with the axes for no-load flow $Q_0$, no-load speed $N_0$ and no-load head $H_0$.

Figure 3:
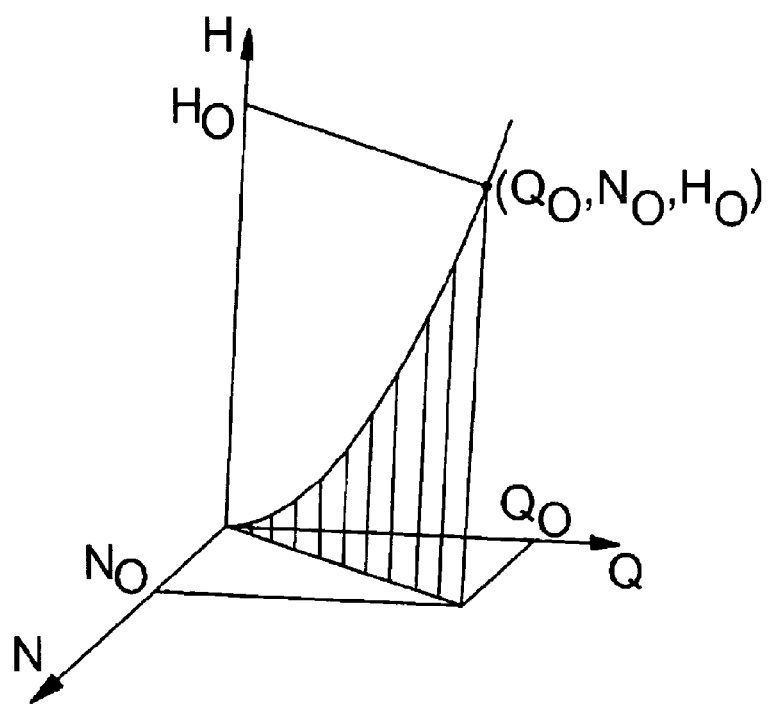
FIG. 3 schematically shows a typical example of a no-load characteristic in three dimensions.

FIG. 3 shows a typical example of such a no-load characteristic in three dimensions. In the case of incompressible fluids with low viscosity like water, liquefied air, liquefied nitrogen, liquefied oxygen, liquefied carbon dioxide or liquefied natural gas, the no-load head $H_0$ is proportional to the square of the no-load flow $Q_0$ and proportional to the square of the no-load speed $N_0$.

$$H_0 = \gamma Q_0^2$$

$$H_0 = \delta N_0^2$$

The ratio between no-load flow and no-load speed is constant and equal to $\lambda$.

$$Q_0/N_0 = \lambda$$

$\gamma$, $\delta$ and $\lambda$ are specific no-load constants for the no-load characteristics. By comparing these constants at different times of turbine operation, the condition of the turbine can be determined.

As described, the no-load characteristic produces no net power output and entirely consumes the hydraulic power input to maintain its rotation at certain speeds. The hydraulic power input is proportional to the product of $H \times Q$ and the lines of constant input power are hyperbolas.

Figure 4:
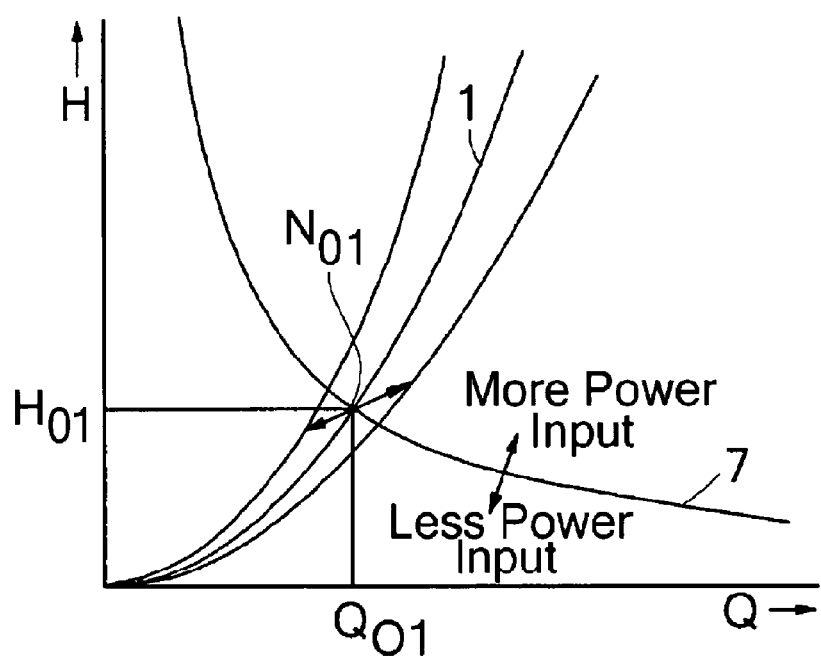
FIG. 4 schematically shows the no-load characteristic of FIG. 3 in two dimensions (no-load flow and no-load head) with an intersecting power input curve.

FIG. 4 shows the no-load characteristic 1 in the two dimensions Q and H. The hyperbolic constant power input curve 7 intersects with the no-load curve at the original no-load point ($Q_{01}$; $N_{01}$; $H_{01}$). If the intersection points of a no-load characteristic corresponding with another condition of the hydraulic turbine for an identical no-load speed $N_0$ moves to the field above curve 7 then the turbine will consume more power input. This is a direct indication for additional hydraulic or mechanical losses, e.g. additional flow restrictions, potential fouling or blockage of fluid passage ways or rotor rubbing or bearing deterioration. If the new intersection points are below curve 7 then less energy will be consumed. This is a direct indication for a reduction of hydraulic or mechanical losses, e.g. increase of internal or external leaks, increase in openings of the fluid passages or similar. Changes to the hydraulic turbine fluid passage ways due to corrosion, erosion, abrasion or cavitation will alter the no-load characteristic. Such changes will be detected. Pending at what location inside the hydraulic turbine such changes to the fluid passages occur and to what degree and extent, the intersection point corresponding with the altered condition can move either direction.

Figure 5:
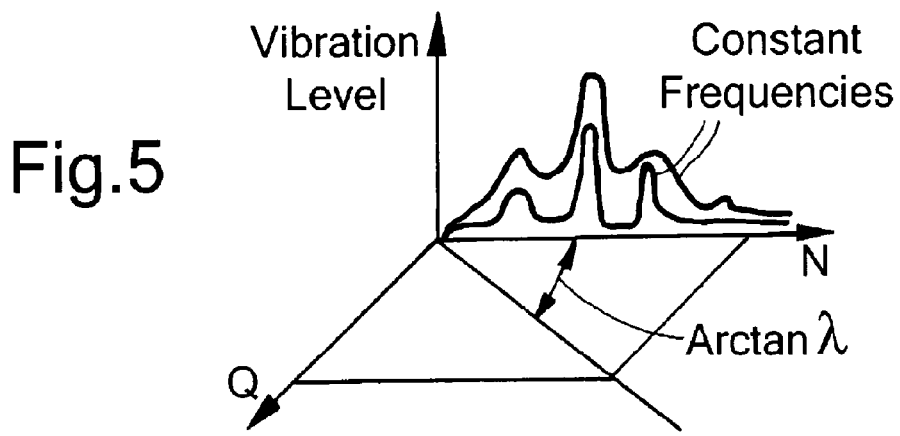
FIG. 5 schematically shows a no-load characteristic for the relation between no-load speed and no-load flow.

FIG. 5 shows the no-load characteristic in two dimensions $N_0$, $Q_0$. It is a line with the slope $\lambda$:

$$\lambda = Q_0/N_0$$

The constant $\lambda$ depends on the design of the turbine runner and measures the difference between the angular momentum of the fluid at runner inlet and outlet. Which is equal to the torque generated by the turbine. For the no-load characteristic with zero-net output torque, $\lambda$ is equal to $Q_0/N_0$. Any change in the slope $\lambda$ directly indicates a change in the power generation of the turbine.

By measuring the mechanical vibration levels and related frequency spectra of the hydraulic turbine rotor-bearing system for operating conditions corresponding with the no-load curve and comparing these with previously obtained vibration levels and frequency spectra under similar conditions, it becomes possible to accurately detect early indications of deteriorating mechanical conditions of the hydraulic turbine rotor bearing system. Such deteriorations can be detected from changes in the vibration levels and frequency spectra before the turbine is energized and potentially can avoid more serious damage whilst operating under load during which failures and its consequences potentially can have more serious impact on equipment and business costs. Any changes in the vibration levels causes also changes in the input energy since vibrations are mechanical losses and can be detected in the no-load characteristic described in FIG. 4.

In other aspects, the invention relates to methods for determining the best efficiency flow ($Q_R$), and optionally also the best efficiency head, for operating a turbine, such as a hydraulic turbine, at a certain turbine speed for a mode where it produces net output power. The best efficiency flow is determined using at least:
rotating a turbine runner of the turbine;
measuring the no-load flow of the turbine in a no-load operating mode for a certain turbine speed; and
determining the best efficiency flow for that turbine speed by multiplying the measured no-load flow by $(1+r_1/r_2)$, wherein $r_1$ is the outer radius of the turbine runner and $r_2$ is the inner radius of the turbine runner.

The turbine may be a fluid-driven turbine, such as a wind- or liquid-driven turbine, comprising a rotating turbine runner.

After the best efficiency flow has thus been determined, the best efficiency head at the turbine may also be determined for said mode where it produces net output power. To this end:
a no-load characteristic of the turbine is determined by operating the turbine in a no-load condition while being subjected to known input values for flow, head, hydraulic energy and fluid properties during measurement of the performance parameters and by measuring the no load flow ($Q_0$) and no load head ($H_0$) for different no load speeds ($N_0$);
a no-speed characteristic of the turbine is determined by operating the turbine in a no-speed condition while being subjected to known input values for flow, head, hydraulic energy and fluid properties during measurement of the no-speed flow and no-speed head,
the no-speed characteristic is shifted upward until at the no-load flow ($Q_0$) for the speed concerned the shifted no-speed characteristic and the no-load characteristic intersect,
at the best efficiency flow ($Q_R$), the best efficiency head ($H_R$) is determined for the speed concerned.

Figure 6:
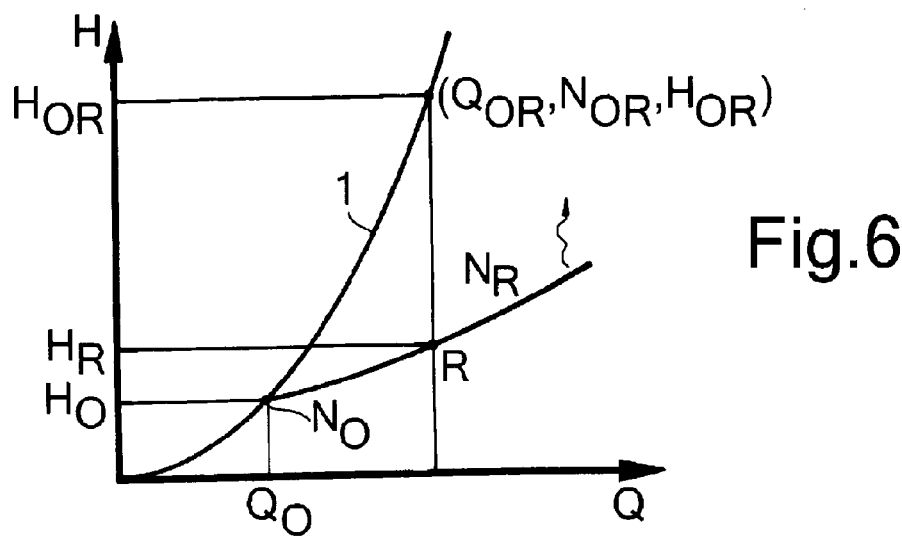
FIG. 6 illustrates the best efficiency point of the hydraulic turbine with respect to the no-load characteristic.

FIG. 6 shows the rated point R that is also the best efficiency point of the hydraulic turbine. Euler's turbine equation requires for the best efficiency point R that the angular momentum of the fluid at the hydraulic turbine runner outlet under ideal conditions is equal to zero, which means that the angular exit velocity is zero.

The angular velocity of the fluid at the hydraulic turbine runner inlet under ideal conditions is equal to the circumferential speed (the tip speed may be used) of the hydraulic turbine runner inlet to avoid fluid entrance losses. With $r_1$ as the outer radius of the hydraulic turbine runner and $r_2$ as the inner radius of the hydraulic turbine runner, $N_R$ as the rated speed, $Q_R$ as the rated flow, $N_{OR}$ as the no-load speed for the no-load flow $Q_{OR}=Q_R$, the angular inlet momentum $r_1 N_R$ is equal to the angular outlet momentum $r_2 (N_{OR}-N_R)$ at the no-load characteristic point ($Q_{OR}$; $N_{OR}$; $H_{OR}$)

$$r_1 N_R = r_2 (N_{OR}-N_R)$$

This condition leads to the relation $$N_{OR}/N_R = 1 + r_1/r_2 \text{ or } N_{OR} = N_R(1+r_1/r_2)$$

The intersection of the rated speed performance characteristic with the no-load characteristic gives the values for the no-load point ($Q_{OR}$; $N_{OR}$; $H_{OR}$) whereas $N_O=N_R$ at this point. As described in FIG. 3 it is known that $$Q_R/Q_0 = N_{OR}/N_R$$

By measuring $Q_0$ and $N_0=N_R$ at the no-load characteristic, the value of the best efficiency or rated flow $Q_R$ can be determined without producing power.

$$Q_R = Q_0(1+r_1/r_2)$$

This provides the opportunity to operate the hydraulic turbine at a best efficiency point that is determined under no load conditions. It reduces the complexity and costs of hydraulic turbine testing at the manufacturers test stand as no net out put power is produced, whilst best efficiency points for an entire range of operating speeds can be accurately determined via indirect measurements.

It is not possible to determine the corresponding best efficiency or rated head $H_R$ with the no-load characteristic. Determining the rated head $H_R$ is possible by measuring and recording a no-speed characteristic as well.

Figure 9:
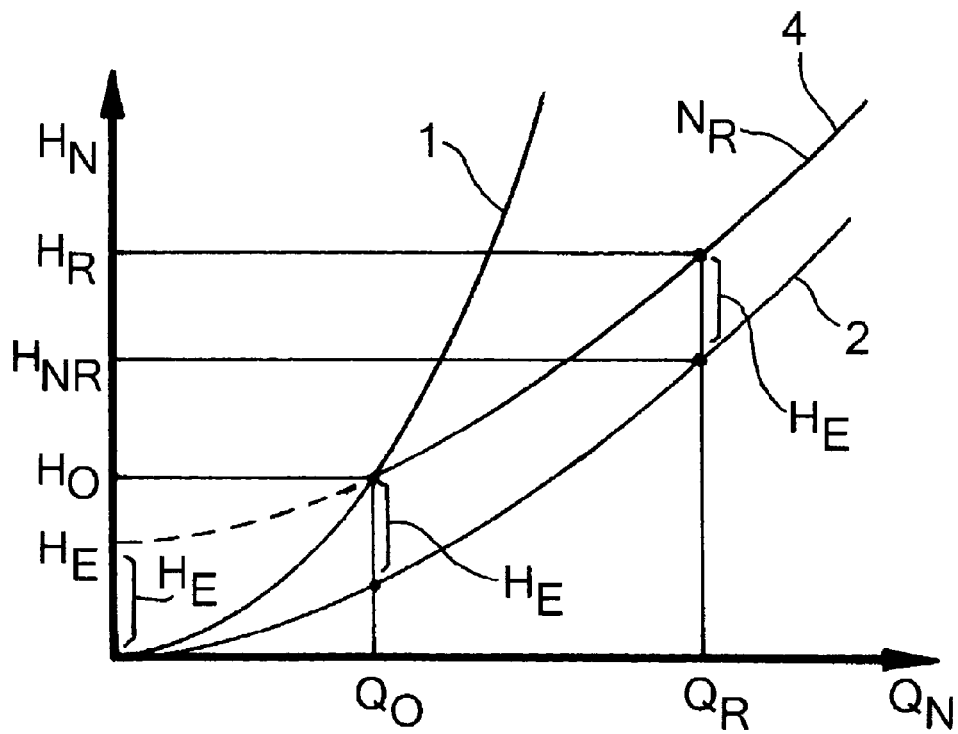
FIG. 9 illustrates the determination of a rated head by means of a no-load characteristic and a no-speed characteristic of the turbine.

The no-speed characteristic as described in FIG. 2 is a curve in the two dimensions Q and H, since the speed N is equal to zero. FIG. 9 shows a typical no-speed characteristic for incompressible liquids with low viscosity like water or liquefied natural gas.

The values for flow Q and head H for the no-speed characteristic are called $Q_N$ and $H_N$. Since the non-rotating turbine is practically like an orifice in the fluid stream, the following relation holds $$H_N = \alpha Q_N^2$$

$\alpha$ is a constant and is the orifice constant of the turbine. The no-speed characteristic can be measured and recorded by locking the rotor with a device that does not permit rotation of the rotor, but permits at most only small axial rotor movements and very small angular movements.

As described in FIG. 2 the constant speed curves 4, 5, 6 are parallel to the no-speed characteristic. By measuring the no-speed characteristic 2 and analyze the data together with the data of the no-load characteristic as in FIG. 6, the best efficiency or rated head $H_R$ for the rated flow $Q_R$ can be determined.

This can be achieved by moving the no-speed characteristic parallel in the direction of increasing head H to the intersection of the no-load point with the speed $N_0=N_R$.

$H_R$ is the head on this shifted no-speed characteristic, which is then equal to the constant rated speed curve.

By measuring the torque generated by the fluid passing through the turbine during locked rotor operation, the torque value $T_N$ is proportional to the square of the flow $Q_N$ $$T_N = \tau Q_N^2$$

By knowing the constant $\tau$, it is possible to determine the shaft torque and the shaft power for regular operation of the turbine. Knowing the mechanical shaft power, the electrical power output of the generator and the hydraulic power input, the efficiency of the electrical generator and the efficiency of the turbine can be independently determined.

In still another aspect, the invention relates to devices for measuring a shaft torque for determining a no-speed characteristic of a turbine.

To measure the torque of a hydraulic turbine at no-speed condition, i.e. when it is at standstill however full hydraulic flow is acting on the turbine, requires a device that prevents rotation, that is locks the shaft, and simultaneously measures the torque from the turbine shaft.

There is thus provided a device for measuring a shaft torque for determining a no-speed characteristic of a turbine. In a first group of embodiments, the device comprises a gear wheel which is attached to the turbine shaft, and a toothed member which is attached to a force measuring sensor, wherein said gear wheel and the toothed member mutually engage and allow for a slight axial movement of the turbine shaft.

The toothed member may for instance be provided in the form of a pinion attached to a torque measuring sensor, or in the form of a gear rack attached to a load cell.

In practice, small axial movements of the rotor assembly in order to adjust thrust balancing for different operational conditions can occur. It is therefore preferable to have a device, which permits for small axial movement and very small angular movements.

Figure 10:
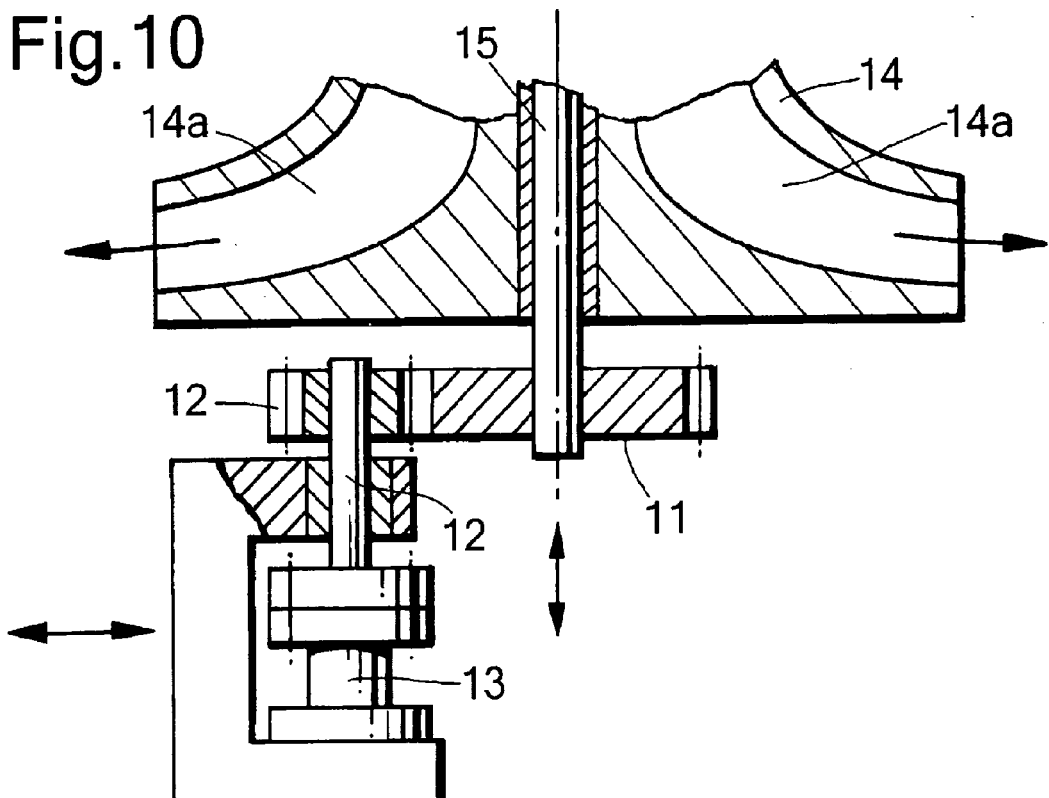
FIG. 10 schematically shows a preferred embodiment of a device for measuring a shaft torque for determining a no-speed characteristic of a turbine.

A first embodiment of the device for measuring a shaft torque for determining a no-speed characteristic of a turbine, is shown in FIG. 10. It shows part of a turbine 14 with a flow outlet 14a and a turbine shaft 15. The device comprises a pair of gears 11, 12 for parallel shafts. The large gear wheel 11 is mounted to one end of the turbine shaft 15 and the smaller pinion gear 12 is mounted to a parallel 12a shaft which includes the measuring device.

The shaft 12a with the pinion is connected to a reaction torque sensor 13, which may be of industrial type and/or flanged. The pinion shaft 12 permits axial rotor movements of the turbine 14 and measures the torque of the turbine 14 during no-speed operation. With a remotely operated actuator (not shown), the shaft 12a with the pinion 12 and torque sensor 13 can be moved in and out of the large gear wheel 11.

Figure 11:
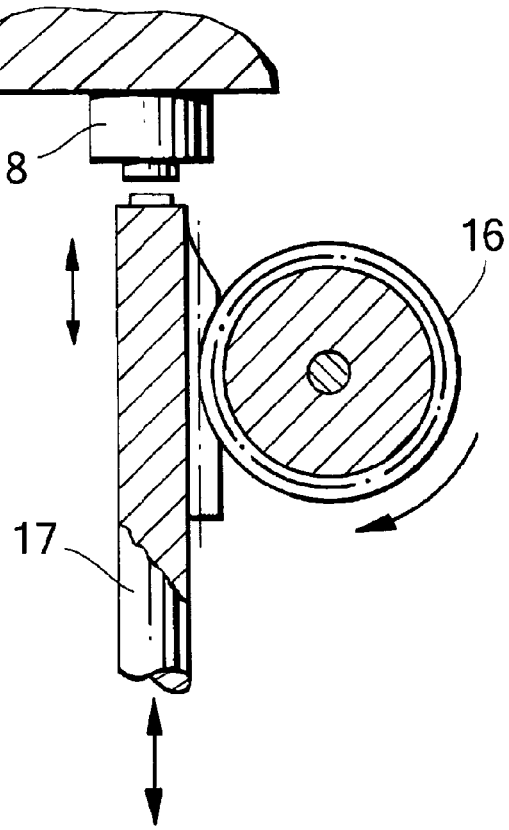
FIG. 11 schematically shows another preferred embodiment of a device for measuring a shaft torque for determining a no-speed characteristic of a turbine.

A second embodiment of the device for measuring a shaft torque for determining a no-speed characteristic of a turbine is shown in FIG. 11. It uses a large bull gear 16 engaged with a straight gear rack 17. The gear rack 17 can be engaged with the gear wheel 16 and moved in and out by means of a remotely operated actuator (not shown). During the measurements the torque from the bull gear 16 is transferred to the rack 17 into a linear force and onwards to a load cell 18.

In another group of embodiments of devices for measuring a shaft torque for determining a no-speed characteristic of a turbine, the device comprises a plate with an outer portion, a centre portion, and spoke-like elements which connect the outer portion and the center portion and define relatively large openings between them, which plate is attachable at its outer portion to a turbine casing and at its centre portion to the turbine shaft, and wherein strain gauges are provided on the spoke-like elements for measuring a tangential deflection of the spoke-like elements due to a torque applied by the turbine shaft.

Figure 12A:
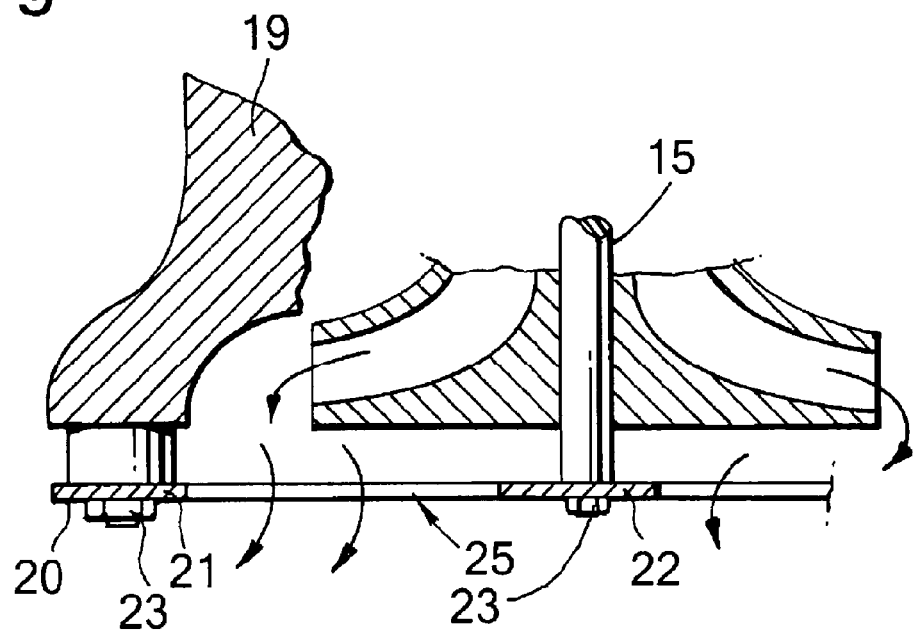
FIG. 12a schematically shows yet another preferred embodiment of a device for measuring a shaft torque for determining a no-speed characteristic of a turbine using a plate.
Figure 12B:
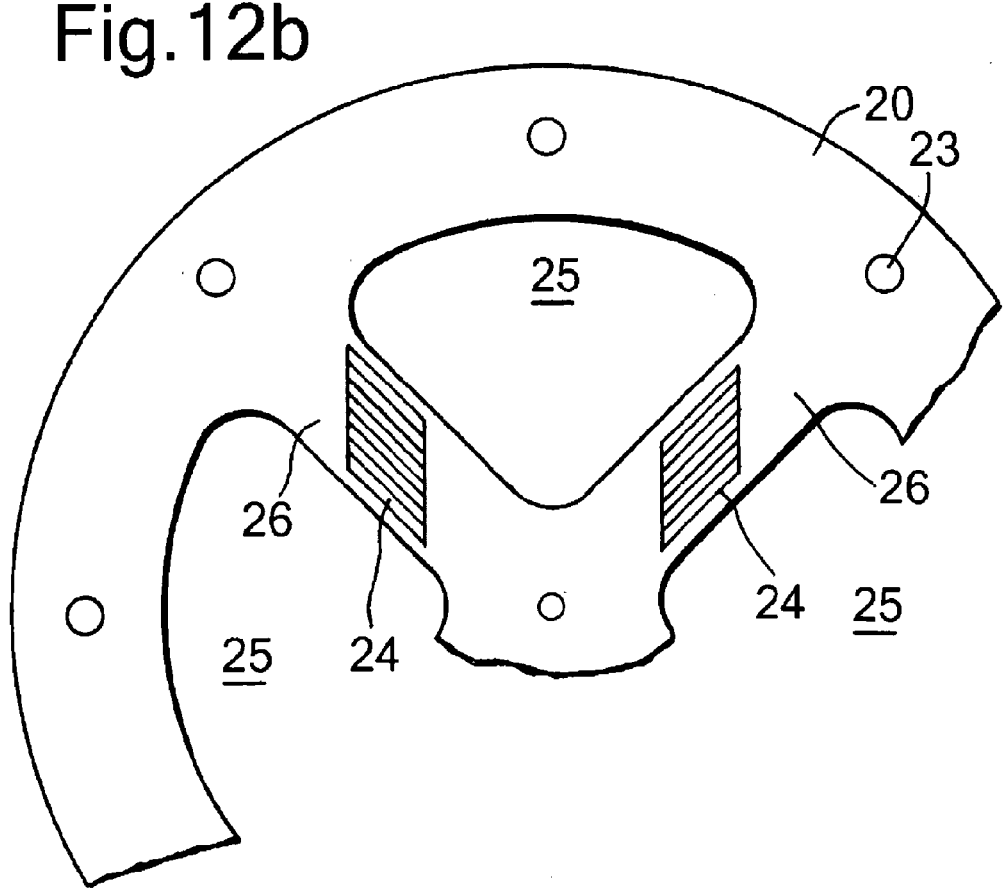
FIG. 12b schematically shows a top view of the plate.

As an example is presented a third embodiment of a device for measuring a shaft torque for determining a no-speed characteristic of a turbine, which uses a flat plate 20 with very large openings 25 (see FIGS. 12a and b) that allow the flow to pass through without substantial obstructions. This plate 20 may be attached by means of bolts 23 or the like to a turbine casing 19 at the perimeter 21 and to the turbine shaft 15 at a centre portion 22. The openings 25 are formed by the outer portion 21, the center portion, and one or more radially extending spoke-like members 26 connecting the center portion 22 and the outer portion 21. The plate 20 is provided with strain-gauges 24 provided on the spoke-like members 26 and fully calibrated to measure the tangential deflection at certain pre-determined locations. Calibration may be done in a jig whilst submerged in the fluid at temperature that serves as testing medium to have full temperature compensation.

The plate 20 may be relatively thin, for example approximately 5mm thick, and it may preferably be made of stainless steel (SS) or aluminium (Al). Its geometry gives it the characteristic of being very stiff in tangential and radial directions, however very flexible in axial direction, wherein the axial direction is the direction perpendicular to the plate surface. Stiffness in the tangential/radial direction and the axial direction will be orders of magnitude difference. This will fix the shaft in radial direction, prevent rotation in a safe manner and present no obstructions to axial movements, e.g. by material expansion and thrust bearing movements. It is a calibrated measuring device, without hysteresis, without friction nor obstruction to flow. It will be easy to install prior to a performance test and can be removed afterwards without having to disassemble the turbine. It however requires the turbine to be removed from its installed position.

In another aspect, the invention relates to a method for detecting a two-phase fluid in an operating turbine.

Turbines are expanding pressurized liquids and in specific cases the expansion process crosses the saturation line of the liquid and the fluid begins partially to vaporize. These partially vaporized fluids are called two-phase fluids. These fluids are actually boiling liquids and generate vapour bubbles. It is difficult to detect a two-phase fluid in an operating turbine, but it is possible to detect it with a method according to this aspect of the invention, comprising at least the steps of:

measuring the no-load mass flow of the turbine in an operating mode where the turbine produces no net output power for different no load turbine speeds;

determining a no net output power characteristic of the turbine;

determining at what no-load mass flow and what no load turbine speed the slope of the characteristic increases so as to determine the starting of two phase formation.

Figure 7:
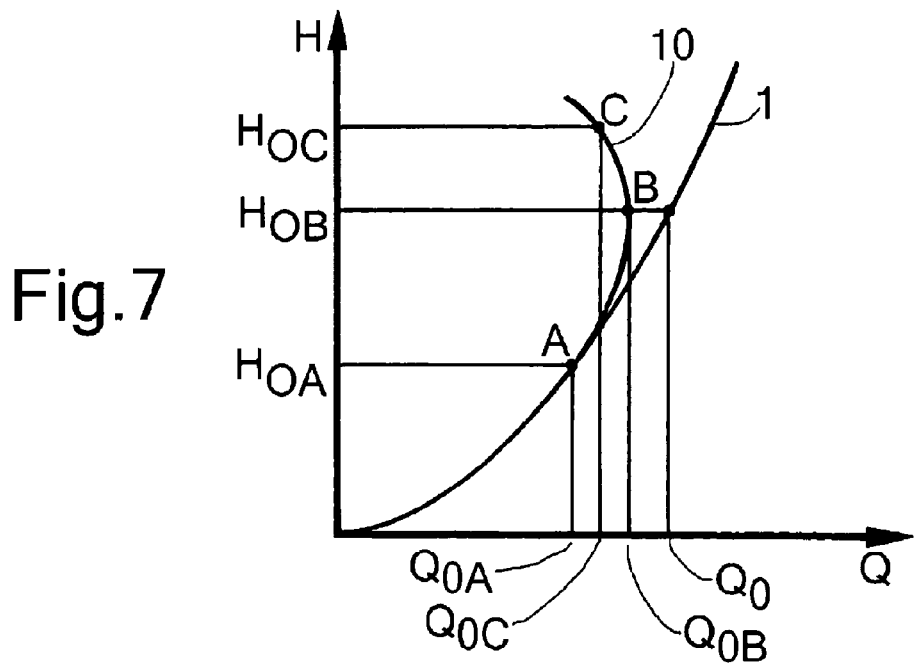
FIG. 7 schematically shows a no-load characteristic in two dimensions (no-load mass flow vs. no-load head) for a two-phase fluid and for a single phase liquid.

FIG. 7 shows the no-load characteristic for two-phase fluids, such as liquid-vapour fluids. For two-phase fluids the flow $Q_0$ may be measured in units of mass per second (e.g. kg/s) and the differential head $H_0$ in units of pressure (e.g. Pascal). By comparing the no-load characteristics for liquids 1 with the no-load characteristics for liquid-vapor mixtures 10, it can be determined at which no-load flow $Q_{0A}$ and no-load differential head $H_{0A}$ the liquid begins to boil.

At this beginning boiling point A the slope of the no-load characteristic 10 increases compared to 1, because more input energy is needed to partially vaporize the fluid. The slope of the two-phase no-load characteristic increases with increasing flow and head until it is practically infinite large, or has a vertical tangent line. At this point B the specific volume of the two-phase fluid reaches a maximum value for the specific geometry of the turbine and it is not possible to increase further the mass flow. If more differential head $H_{0C}$ is applied, then the specific volume is further increasing but reduces the mass flow $Q_{0C}$.

Figure 8:
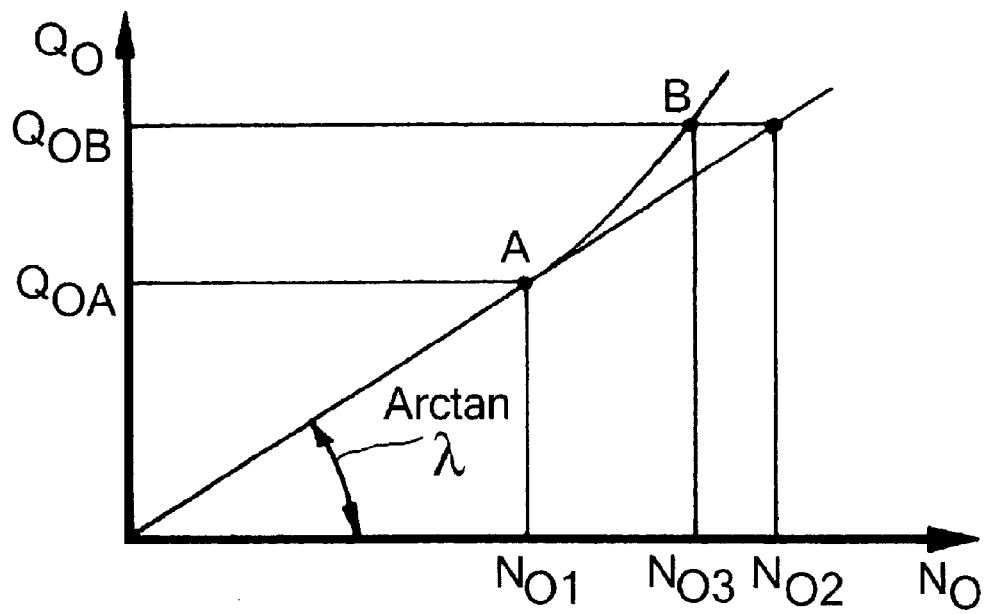
FIG. 8 schematically shows a no-load characteristic in two dimensions (no-load mass flow vs. no-load turbine speed) for a two-phase fluid and for a single phase liquid.

FIG. 8 shows the no-load characteristic for two-phase fluids in comparison with the no-load characteristic for liquids only in two dimensions $N_0$=speed and $Q_0$=mass flow. At the point A the slope changes and this is the starting point of two-phase formation.

The specific volume divided by the area of the cross-section at the turbine runner outlet and multiplied by the mass flow is equal to the velocity of the fluid. At the point B this velocity is equal to the speed of sound for the specific two-phase fluid.

By comparing the no-load characteristics for liquid only and for liquid-vapor mixture for the same mass flow $Q_0$, it shows that the no-load speeds $N_{OL}$ and $N_{OB}$ are not equal. Due to the conservation of angular momentum, the ratio of the no-load speed $N_{OL}$ for liquids and the no-load speed $N_{OB}$ for two-phase fluid are equal to the ratio of the specific densities of the liquid to the two-phase fluid. Therefore the specific density of the two-phase mixture can be determined if the specific density of the liquid is known. The specific volume is reciprocal to the specific density and by knowing the specific volume for the liquid, the specific volume of the two-phase mixture can be determined. From the determined specific volume of the two-phase mixture the percentage of vapor can be calculated and also the speed of sound, as described above.

Figure 13:
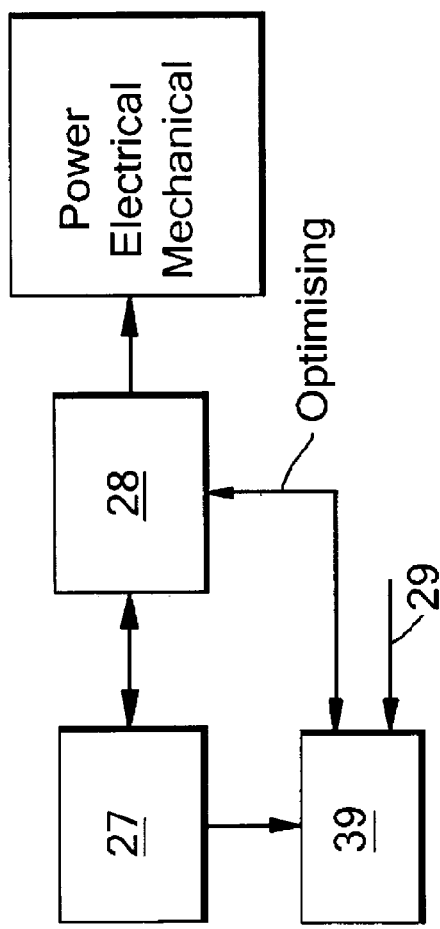
FIG. 13 schematically shows a schematic representation of a turbine system according to the invention.

FIG. 13 shows a schematic diagram of a turbine system. The system comprises a turbine generator train illustrated by a block indicated by reference numeral 27. A performance and condition monitoring unit 39 will collect data from the turbine train 27 and provide specific output to a control unit 28 of the turbine train 27. The performance and monitoring unit 39 has preferably a remote access capability, illustrated by an arrow indicated by reference numeral 29. The remote access capability permits data transfer to others. The monitoring unit 39 can be integrated as a separate unit in the system as is indicated in FIG. 13. An alternative to a separate monitoring unit 39 is to incorporate the functionality directly into the control unit 28 of the turbine.

The monitoring unit 39 will give the capability to optimise the operation of the turbine train 27 and thereby the power delivered either as electrical power or mechanical power or hydraulic function of the turbine, depending on the turbine train configuration.

Figure 14:
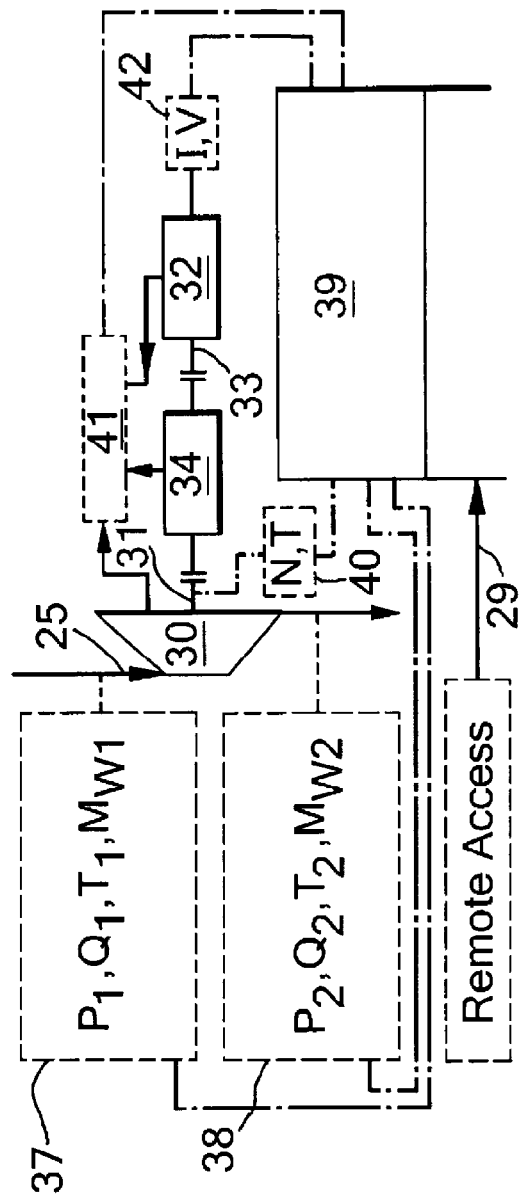
FIG. 14 schematically shows another schematic representation of a turbine system according to the invention.

FIG. 14 shows a typical arrangement for a turbine system comprising a turbine-generator train. The turbine system comprises a turbine 30 with an output shaft 31. The system further comprises a generator 32 for generating electrical power with an input shaft 33. Between the output shaft 31 of the turbine 30 and the input shaft 33 of the generator 32 a gearbox 34 is arranged.

The turbine 30 has a turbine inlet 35 and a turbine outlet 36. At the turbine inlet 35 is arranged a sensor unit indicated by 37 for measuring the pressure $P_1$, flow $Q_1$, temperature $T_1$ and molecular weight $MW_1$ of the driving fluid at the inlet 35 of the turbine 30. At the turbine outlet 36 is arranged a set of sensors indicated by 38 for measuring the pressure $P_2$, flow $Q_2$, temperature $T_2$ and molecular weight $MW_2$ of the driving fluid at the outlet 36 of the turbine 30. The sensor units 37 and 38 have a plurality of sensors for measuring the separate parameters.

The sensor units 37 and 38 are connected to a monitoring unit 39 for monitoring the condition and performance of the turbine-generator train for providing signals representing the measured values of the parameters thereto.

At the output shaft 31 of the turbine 30 a sensor unit 40 is arranged for measuring the shaft speed N and the shaft torque T. This sensor unit 40 also can have a plurality of sensors for measuring the separate parameters N and T. The sensor unit 40 is connected to the monitoring unit 39 for providing signals representing the measured parameters thereto.

Preferably, at the shaft 31 and at the generator 32 vibration signals and bearing temperature signals are measured by sensor unit 41 comprising a plurality of sensors for measuring the separate parameters. Preferably, at the generator 32 and control unit the electrical parameters current I and voltage V for all phases combined with phase angles are measured by sensor unit 42. The sensor units 41 and 42 are connected to the monitoring unit 39 for providing signals representing the measured parameters thereto.

The functionality of the monitoring unit 39 includes preferably data collection, data analysis, algorithms to calculate performance and condition characteristics, comparison of characteristics, output to the control unit to optimise operation, data storage and keeping history.

The performance and condition characteristics may include quality information on one or more of:
Hydraulic performance, such as: pressure, head, flow, hydraulic efficiency;
Thermodynamic performance, such as: pressure, head, temperature, flow, molecular weight, thermodynamic efficiency;
Aerodynamic performance, such as: flow field patterns, fluid velocity at blades, propellers, runners and turbine wheel;
Electrical Performance, such as: currents, voltages, frequency patterns, phase angles;
Mechanical condition, such as: vibration patterns, material stress, shaft torques, shaft speeds, bearing temperatures, auxiliary systems parameters.

Figure 16:
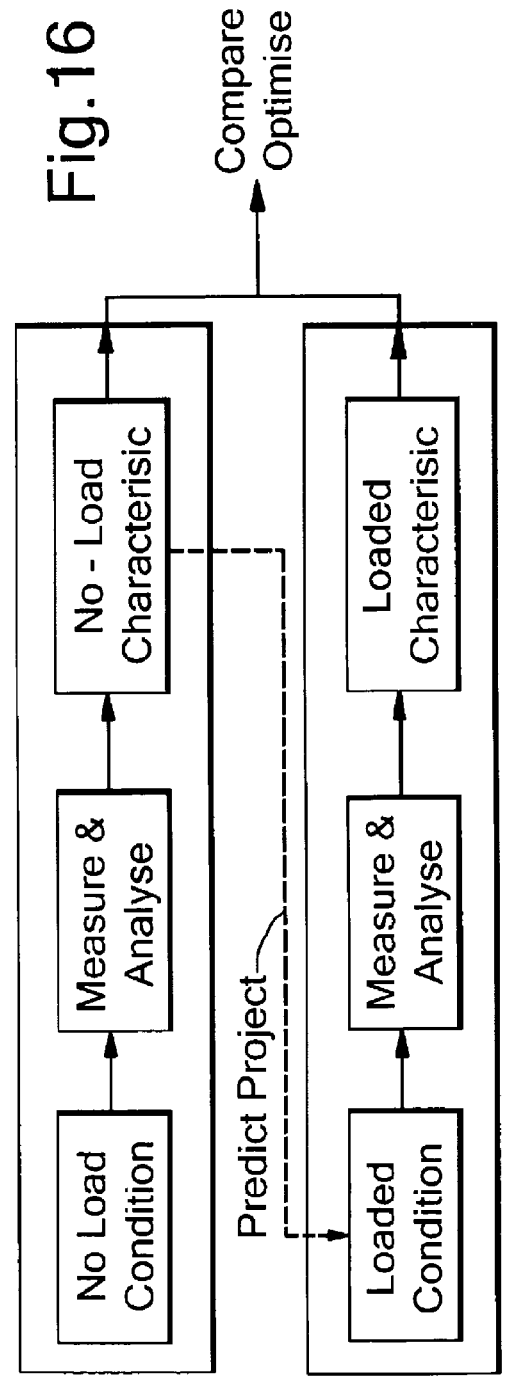
FIG. 16 shows a schematic representation of optimization of operating assets.

Determining the characteristic of turbines under no-load conditions by means of a monitoring unit 39 will give a capability for asset management of installations and equipment. Optimising the operation of a turbine train based on real time performance and condition data characteristics obtained at no-load and load conditions will provide a managing capability to: operate at best efficiency points of the turbine train, risk reduction to avoid unexpected failures (maximise reliability), extend operating windows until best opportunity to execute maintenance (maximise availability), protection and safeguarding at high level, reduce operating costs significantly. FIG. 16 shows a scheme with the building blocks for such optimization of operating assets.

Figure 15A:
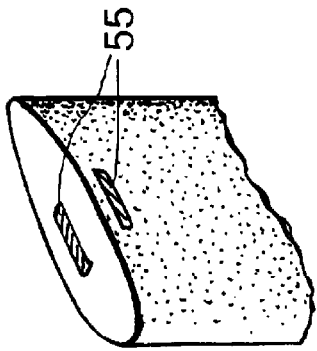
FIG. 15a schematically shows a detail of FIG. 15.
Figure 15:
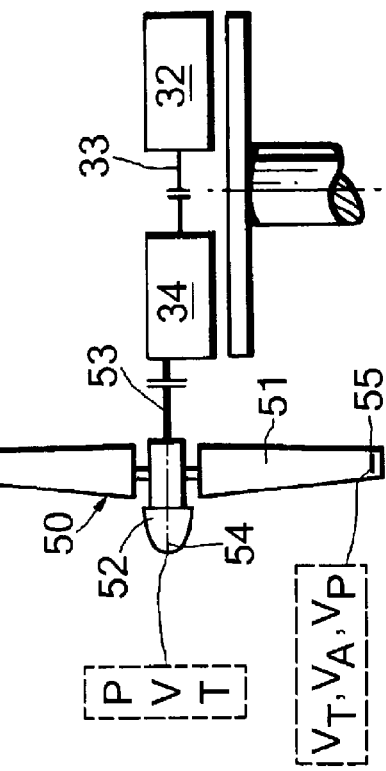
FIG. 15 schematically shows a typical arrangement for a wind turbine.

FIG. 15 shows a typical arrangement for a wind turbine. It shows a rotor 50 with rotor blades 51, a nacelle 52 and an output shaft 53, which is coupled to a gear box 34. Further the system comprises a generator 32 with an input shaft 33, which is connected to the gear box 34. Wind pressure P, temperature T and velocities V are measured at the nacelle 52 by a sensor unit 54.

At one or more of the blade tips sensors 55 are (see FIG. 15a) arranged for measuring blade tip velocity and wind velocities in tangential direction $V_t$, axial direction $V_a$, and peripheral direction $V_p$. The wind turbine can be controlled and monitored by a similar configuration as is indicated in FIG. 13.

What is claimed is:

1. Method of monitoring the condition of a turbine, comprising the steps of:
determining an initial no net output power characteristic for the turbine;
allowing the turbine to run for an amount of time;
determining a new no net output power characteristic for the turbine; and
comparing the new no net output power characteristic with the initial no net output power characteristic, wherein differences in the no net output power characteristics give indications about the condition of the turbine.

2. Method according to claim 1, further comprising the step of determining performance of the turbine for an operating mode where the turbine produces net power based on the no net output power characteristics.

3. Method according to claim 2, wherein determining the initial no net output power characteristic comprises:
measuring one or more characteristic performance parameters, selected from the flow ($Q_0$, $Q_N$), turbine speed ($N_0$) and/or head ($H_0$, $H_N$), or any combination of these, of the turbine in an operating mode where the turbine produces no net output power;

producing the no net output power verification characteristic of the turbine based on the measured one or more characteristic performance parameters.

4. Method according to claim 3, wherein determining the new no net output power characteristic for the turbine comprises:

measuring one or more characteristic performance parameters, selected from the flow ($Q_0$, $Q_N$), turbine speed ($N_0$) and/or head ($H_0$, $H_N$), or any combination of these, of the turbine in the operating mode where the turbine produces no net output power;

producing the no net output power characteristic of the turbine based on the measured one or more characteristic performance parameters.

5. Method according to claim 2, further comprising the step of determining the condition of the turbine based on the differences between the new no net output power characteristic and the initial no net output power characteristic.

6. Method according to claim 1, wherein determining the initial no net output power characteristic comprises:

measuring one or more characteristic performance parameters, selected from the flow ($Q_0$, $Q_N$), turbine speed ($N_0$) and/or head ($H_0$, $H_N$), or any combination of these, of the turbine in an operating mode where the turbine produces no net output power;

producing the no net output power verification characteristic of the turbine based on the measured one or more characteristic performance parameters.

7. Method according to claim 6, wherein determining the new no net output power characteristic for the turbine comprises:

measuring one or more characteristic performance parameters, selected from the flow ($Q_0$, $Q_N$), turbine speed ($N_0$) and/or head ($H_0$, $H_N$), or any combination of these, of the turbine in the operating mode where the turbine produces no net output power;

producing the no net output power characteristic of the turbine based on the measured one or more characteristic performance parameters.

8. Method according to claim 7, further comprising the step of determining the condition of the turbine based on the differences between the new no net output power characteristic and the initial no net output power characteristic.

9. Method according to claim 6, further comprising the step of determining the condition of the turbine based on the differences between the new no net output power characteristic and the initial no net output power characteristic.

10. Method according to claim 1, further comprising the step of determining the condition of the turbine based on the differences between the new no net output power characteristic and the initial no net output power characteristic.

11. Method according to claim 1, wherein said amount of time during which the turbine is allowed to run is a predetermined amount of time.

12. Method according to claim 1, wherein the at certain time intervals new no net output power characteristics are determined so as to monitor the performance of the turbine over time.

13. Method according to claim 1, wherein the no net output power characteristics are determined while the turbine is operated in a no-load condition under known input values for flow, head, hydraulic energy and fluid properties during measurement of the one or more performance parameters.

14. Method according to claim 13, further comprising:
determining an intersection point between the measured no-load characteristic of the turbine and a constant-power input curve; and
comparing the intersection point to a reference intersection point between an earlier measured no-load characteristic of the turbine and the constant-power input curve so as to determine if hydraulic losses have increased or decreased.

15. Method according to claim 1, wherein the no net output power characteristics are determined while the turbine is operated in a no-speed condition while being subjected to known input values for flow, head, hydraulic energy and fluid properties during measurement of the performance parameters.

16. Turbine system comprising:
a turbine drivable by a fluid flow, which turbine has an output shaft to which it delivers an output power during operation;
measuring means arranged at the turbine for measuring operational parameters of the turbine;
a monitoring unit for monitoring the condition of the turbine train, which monitoring unit is connected to the measuring means, which monitoring unit comprises a memory in which an initial no net output power characteristic for the turbine is stored, as well as computing means to calculate a new no net output power characteristic of the turbine train based on the measured operational parameters, and a comparer to compare the new no net output power characteristic with the initial no net output power characteristic.

17. Turbine system according to claim 16, further comprising
a turbine control unit connected to the monitoring unit, and arranged to generate control signals for controlling the operation of the turbine;
wherein the monitoring unit is adapted to generate one or more signals representative for the performance and/or condition of the turbine which are provided to the control unit.

18. Turbine system according to claim 16, wherein the turbine is comprised in a turbine-generator train, which further comprises a generator connected to the output shaft, for transforming the output power delivered by the turbine at the output shaft into electrical energy.

19. Turbine system according to claim 16, wherein the turbine is comprised in a turbine-generator train, which further comprises a generator connected to the output shaft, for transforming the output power delivered by the turbine at the output shaft into electrical energy, and further comprising
a turbine control unit connected to the monitoring unit, and arranged to generate control signals for controlling the operation of the turbine-generator train; wherein the monitoring unit is adapted to generate one or more signals representative for the performance and/or condition of the turbine-generator train which are provided to the control unit.

20. Turbine system of claim 16, wherein said operational parameters are selected from the group consisting of flow ($Q_0$, $Q_N$), turbine speed ($N_0$) and head ($H_0$, $H_N$).

* * * * *